United States Patent [19]

Hurt

[11] 4,327,501

[45] May 4, 1982

[54] SQUARE ADAPTER FOR LEVEL

[76] Inventor: Alfred A. Hurt, 116 Harvey Ave., Oak Hill, W. Va. 25901

[21] Appl. No.: 91,745

[22] Filed: Nov. 6, 1979

[51] Int. Cl.$^3$ .............................................. B43L 7/06
[52] U.S. Cl. ...................................... 33/465; 33/451; 33/478; 33/500; 33/376
[58] Field of Search ................. 33/451, 465, 478, 376, 33/495–500, 342

[56] References Cited

U.S. PATENT DOCUMENTS

| | | | |
|---|---|---|---|
| 509,292 | 11/1893 | Bretz | 33/465 X |
| 563,370 | 7/1896 | Goldsberry | 33/478 |
| 1,324,411 | 12/1919 | Rosenholm | 33/342 |
| 1,380,243 | 5/1921 | Osborn | 33/342 X |
| 1,630,773 | 5/1927 | Van Gale | 33/498 X |
| 2,250,830 | 7/1941 | Gonzales | 33/496 |
| 4,152,838 | 5/1979 | Cook | 33/342 |

Primary Examiner—Charles E. Phillips
Attorney, Agent, or Firm—Harvey B. Jacobson

[57] ABSTRACT

Mounting structure is provided for support from one side of an elongated body of a carpenter's level having a window extending transversely therethrough and opening through the aforementioned one side of the body. The mounting structure pivotally supports one end of an elongated arm from a first end of the body for swinging between a first position in superposed parallel relation to the aforementioned one side of the body and a second position with the arm projecting at 90° relative to the body. The window in the body has a spirit level mounted therein and the arm includes a portion thereof in registry with the window having an opening formed therethrough. Also, the mounting structure and arm include coacting first latch portions for releasably retaining the arm in the second extended position thereof and second coacting latch portions for releasably retaining the arm in the first position thereof. Further, the mounting structure and arm are of configurations enabling the mounting structure to be utilized in operatively mounting the arm on substantially all forms of elongated level bodies.

4 Claims, 5 Drawing Figures

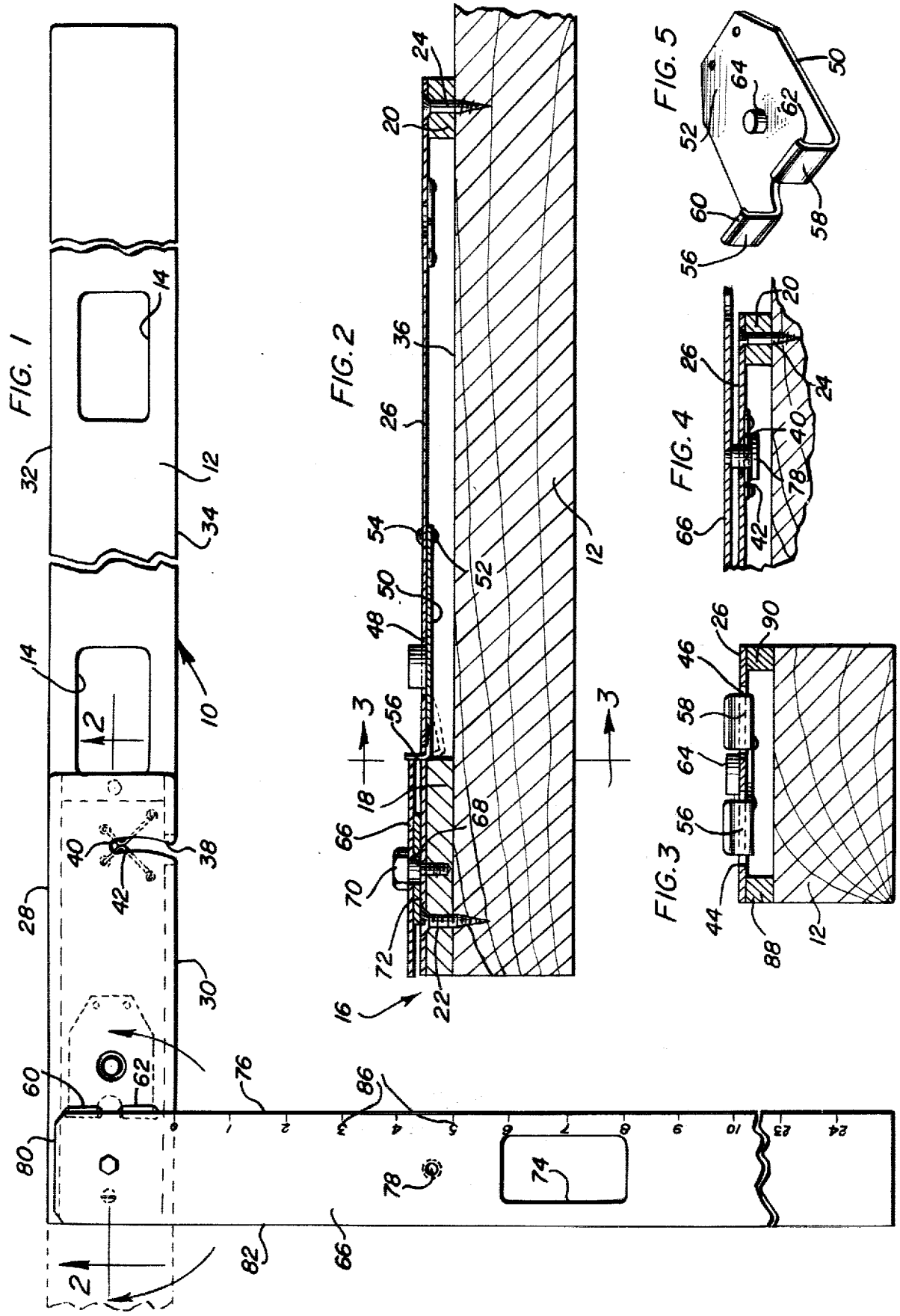

SQUARE ADAPTER FOR LEVEL

BACKGROUND OF THE INVENTION

Various forms of square adapters for carpenter's levels have been heretofore provided. However, most of these previously known forms of adapters require specially constructed squares and do not include positive structure whereby the square adapter may be accurately secured in a square defining position relative to the associated level body.

Accordingly, a need exists for a square adapter for a carpenter's level constructed in a manner whereby the square adapter may be readily mounted on substantially all forms of carpenter levels and the square adapter may be accurately positioned relative to the carpenter level to define a carpenter's square.

Various forms of square adapters for levels including some of the general structural and operational features of the instant invention are disclosed in U. S. Pat. Nos. 973,437, 1,324,411, 1,646,958 and 1,663,821.

BRIEF DESCRIPTION OF THE INVENTION

The square adapter of the instant invention is constructed in a manner whereby it may be readily attached substantially all forms of carpenter's levels. In addition, the square adapter is constructed in a manner whereby a dependable carpenter's square may be defined and without the square adapter interferring with the viewing of the spirit level portions of the associated carpenter's level.

The main object of this invention is to provide a dependable retractable square adapter for a carpenter's level.

Another object of this invention is to provide a spirit adapter for a carpenter's level which includes dependable latch structure for releasably securely retaining the arm portion of the square adapter in a square defining operative position disposed at 90° relative to the associated level body.

Yet another object of this invention is to provide a square adapter including releasable latch structure for retaining the square defining arm portion of the adapter in a retracted position.

Yet another object of this invention is to provide a square adapter which may be readily mounted on existing carpenter's squares and which will not interfere with viewing of the spirit levels of the carpenter's square.

A final object of this invention to be specifically enumerated herein is to provide a square adapter for a carpenter's level constructed in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary plan view of a conventional form of carpenter's level with the square adapter of the instant invention operatively associated with the body of the level and in position relative thereto defining a carpenter's square therewith;

FIG. 2 is an enlarged fragmentary vertical sectional view taken substantially upon the plane indicated by the section line 2—2 of FIG. 1;

FIG. 3 is a transverse vertical sectional view taken substantially upon the plane indicated by the section line 3—3 of FIG. 2;

FIG. 4 is an enlarged fragmentary longitudinal vertical sectional view of the latching structure of the square adapter by which the arm portion of the square may be retained in a retracted position; and FIG. 5 is a perspective view of the latch structure of the adapter by which the arm portion thereof may be releasably retained in an extended operative position.

DETAILED DESCRIPTION OF THE INVENTION

Referring now more specifically to the drawings, the numeral 10 generally designates a conventional form of level including an elongated body 12 in generally rectangular cross section. The body 12 includes a plurality of longitudinally spaced windows 14 formed therethrough and the windows 14 may have any suitable form of spirit levels (not shown) mounted therein viewable from the opposite sides of the body 12 through which the windows 14 open.

The square adapter of the instant invention is referred to in general by the reference numeral 16 and includes first and second mounting blocks 18 and 20. The mounting block 18 is secured to one end of the body 12 by a suitable fastener 22 and the mounting block 20 is secured to the body 12 intermediate its opposite ends by a suitable fastener 24. An elongated metal strip 26 extends between and has its opposite ends secured in overlapped engagement with the blocks 18 and 20 by the fasteners 22 and 24 and it may be seen from FIG. 1 of the drawings that opposite longitudinal side edges 28 and 30 of the metal strap 26 are coextensive with the corresponding opposite sides 32 and 34 of the body 12. The mounting blocks 18 and 20 support the metal strap 26 in spaced relation above the upper surface 36 of the body 12 and the strip 26 includes a transverse slot 38 formed therein opening outwardly of the edge 30 of the strip 26. A pair of mirror image L-shaped wire springs 40 and 42 are supported from the underside of the mounting strip 26 on opposite sides of and project into the inner closed end of the slot 38 for a purpose to be hereinafter more fully set forth.

The strip 26 includes a pair of transversely spaced and extending closed ended slots 44 and 46 formed therein a safe distance from the terminal end of the strip 26 with which the fastener 22 is associated and the strip 26 further includes a cylindrical opening 48 formed therein on the side of the slot 44 remote from the fastener 22. A leaf spring-type latch 50 is provided and has one end 52 thereof secured by rivets 54 to the underside of the strip 26 and the other end of the spring latch 50 includes a pair of upwardly directed tongues 56 and 58. The tongues 56 and 58 project upwardly through the slots 44 and 46 and their upper ends 60 and 62 are curved, slightly, back toward the one end 52 of the leaf spring-type latch 50. Also, the longitudinal central portion of the leaf spring-type latch 50 includes an upwardly projecting button 64 removably secured thereto as by spot welding and which projects upwardly through the bore or aperture 48 and may be engaged by a digit of one hand of the user in order to depress the button 64 and thus downwardly retract the tongues 56 and 58 through the slots 44 and 46.

In addition to the metal strap 26, the square adapter 16 includes a flat metal arm 66. One end of the arm 66 includes a bore 68 formed therethrough and a pivot fastener 70 includes a shank portion received through the bore 68, the metal strip 26 and secured in the mounting block 18 as at 72 in order to pivotally attach the arm 66 to the end of the metal strap 26 supported from the mounting block 18, a fiber washer 72 being disposed about the shank of the pivot fastener 70 between the arm 66 and the metal strap 26.

The arm 66 includes an opening 74 formed therethrough registrable with the window 14 adjacent the mounting block 20 when the arm 66 is disposed in superposed relation relative to the metal strap 26 and body 12 and a second opening (not shown) registrable with the second window 14. The tongues 56 and 58 are wedged tightly against the longitudinal side edge 76 of the arm 66 when the arm 66 is in the extended position thereof illustrated in FIG. 1 of the drawings with the edge 76 disposed at right angles relative to the edge 30 and side 34. Thus, the tongues 56 and 58, disposed on opposite sides of a plane containing the pivot fastener 70 and extending longitudinally of the body 12, securely retain the arm 66 in the operative position thereof. However, when the button 64 is depressed in order to downwardly deflect the tongue supporting end of the leaf spring latch 50, the arm 66 may be swung in a counterclockwise direction from the position thereof illustrated in FIG. 1 of the drawings to a position in superposed relation relative to the strip 26 and the body 12. The underside of the arm 66 includes a depending headed lug 78 swingable into the slot 38 and snap receivable behind the springs 40 and 42 to releasably latch the arm 66 in the fully retracted position in superposed relation relative to the strip 26 and the body 12. However, from the position thereof illustrated in FIG. 1 of the drawings, the arm 66 may also be swung in a clockwise direction to a position paralleling the body 12 and with the tongues 56 and 58 wedgedly engaged with the end edge 80 of the arm 66. Also, inasmuch as the bore 68 is spaced centrally intermediate the edge 76 and the remote edge 82 of the arm 66, the arm 66 may also be swung to and releasably secured in a position rotated 180° relative to the position thereof illustrated in FIG. 1 of the drawings with the tongues 56 and 58 in wedging engagement with the edge 82 of the arm 66.

The edge 76 includes measuring indicia 86 spaced longitudinally therealong and it is deemed obvious from the foregoing that the square adapter may be used as a folding square in many different environments. It may be used by carpenters, brick masons, sheet rock hangers and generally as a carpenter's square wherever desired. Further, it will be noted that the attachment 16 may be readily attached to existing levels.

Corresponding opposite ends of the blocks 18 and 20 are interconnected by opposite side rails 88 and 90 and, accordingly, only single fasteners 22 and 24 are needed to secure the blocks 18 and 20 to the body 12. Also, the rails 88 and 90 serve to support the longitudinal edges 28 and 30 of the metal strip 26 and to prevent debris from accumulating in the area beneath the mounting strip 26 and interferring with operation of the leaf spring-type latch 50 and the latching springs 40 and 42.

It will further be noted that the basic latching structure defined by the leaf-type latch 50 and asociated edge 76 of the arm 66 may also be incorporated as a latch for holding table legs, folding tie squares, folding tee squares, and other forms of folding and locking tools.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A square including an elongated body having at least one side edge defining a straight reference path and an elongated arm having parallel opposite side longitudinal edges and an end edge on one end disposed at right angles relative to said longitudinal edges, mounting means pivotally mounting said one end of said arm to the other end of said body for swinging of said arm relative to said body about an axis transverse to said arm and body and with said axis spaced equal distances from said end edge and said side longitudinal edges of said arm, said mounting means including latch means operative to releasably latch said arm in three successive 90° relatively rotated positions relative to said body in which said end edge or one of said side longitudinal edges parallels said reference path, said latch means including a latch member having a portion thereof shiftable relative to said body along a path segment disposed generally normal to the plane in which said arm may be swung relative to said body and spaced from said axis longitudinally along said body toward the other end thereof a distance substantially equal to the spacing between said axis, said end edge and said side longitudinal edges, said portion of said latch member defining a pair of laterally spaced tongues having free ends and disposed on opposite sides of a plane containing said axis and paralleling said reference path, said tongues being shiftable between an operative position wherein said tongues extend through an opening in said elongated body and an inoperative position retracted from said opening, means for biasing said tongues toward said operative position, said tongues, when disposed in said operative position, being tightly laterally abutted against one of said end and side longitudinal edges when said arm is in one of said three successive 90° relatively rotated positions, said free ends of said tongues extend away from said mounting means when said tongues occupy said operative position.

2. The square of claim 1 wherein said biasing comprises an elongated leaf spring, said tongues being carried by one end of said leaf spring and the other end of said leaf spring being stationarily anchored relative to said elongated body.

3. The square of claim 1 wherein said arm is swingable to a fourth 90° rotated position relative to said body in superposed parallel relation therewith, and second latch means carried by said arm and body operative to releasably retain said arm in said fourth 90° rotated position relative to said body.

4. The square of claim 3 wherein said second latch means includes a shank carried by said arm projecting laterally through the plane through which said body is swingable relative to said arm and a laterally outwardly opening transverse slot formed in said body opening through one longitudinal side thereof and spaced from said axis and in which said shank is receivable, said body including means operative to automatically engage said shank and releasably retain the latter within an inner end portion of said slot responsive to movement of said shank into said slot through the open end thereof.

* * * * *